Patented Jan. 20, 1931

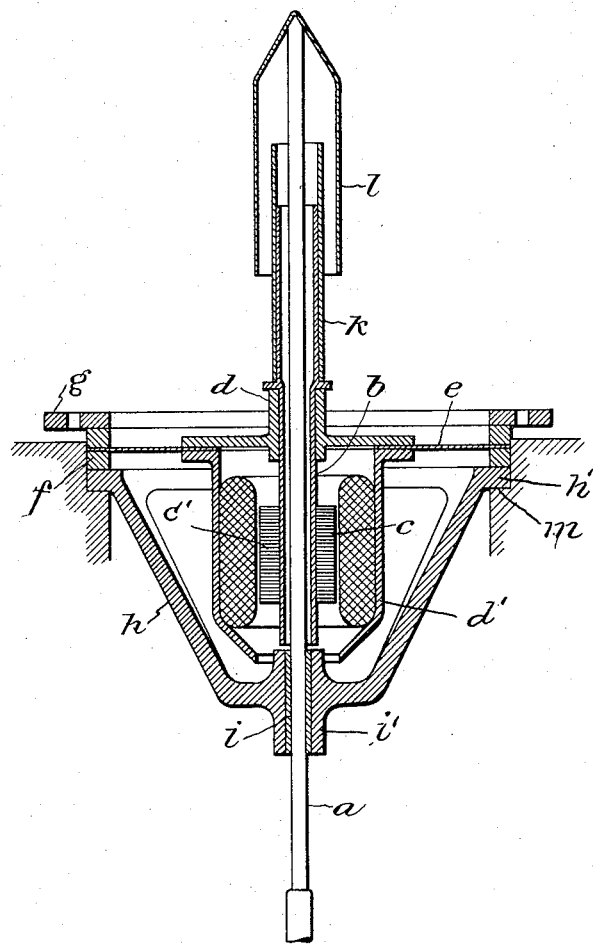

1,789,676

UNITED STATES PATENT OFFICE

ALFRED FRIEDERICH, OF WOLFEN, KREIS BITTERFELD, GERMANY, ASSIGNOR TO I. G. FARBENINDUSTRIE AKTIENGESELLSCHAFT, OF FRANKFORT-ON-THE-MAIN, GERMANY

ELECTRICALLY-DRIVEN SPINDLE FOR SPINNING YARN

Application filed November 2, 1927, Serial No. 230,649, and in Germany November 12, 1926.

The method of mechanically driving the winding bobbins in spinning or twisting processes is well known. An extension of the wharve driven by a cord or band carries the sleeve of the yarn bobbin. The wharve and sleeve rotate about the fixed axis of the cap spindle which serves as a bearing and guide for the rotary movement of the outer hollow spindle, while the cap spindle and outer hollow spindle are relatively displaced in the axial direction in dependence on the vertical winding movement.

This twisting process, particularly in the working of artificial threads, requires the hollow spindle to be driven at a high speed and this high speed cannot be reliably obtained with mechanical driving means. It has, therefore, been attempted to apply an individual electrical driving means to each spindle, for example by attaching the rotor of a small electric motor to the lower end of the hollow spindle which carries the winding bobbin. This method is unsatisfactory, however, on account of the shaking and oscillation set up in both spindles. The hollow spindle, which is loaded with a greater mass than formerly, requires some flexibility in its adjustment and mounting and such adjustment is prevented because the internal or cap spindle slides through the whole length of the outer spindle.

This difficulty is obviated according to the present invention by mounting the cap spindle entirely independently of the electrically driven hollow spindle and leading it through the entire length of the hollow spindle in spaced relation thereto and thus with a suitable air space between them. In this manner the axis of the rotating hollow spindle can be adjusted radially relatively to the axis of the cap spindle and any damage to the cap by exceeding the critical speed is prevented.

These arrangements, however, require that the outer or hollow spindle and the inner or cap spindle be accurately centered with respect to one another and maintained out of contact in spite of oscillation of the hollow spindle and periodical axial movement of the cap spindle. For this purpose the guiding bush of the cap spindle is carried by a rigid centering or bearing member which is supported and positioned together with the centering ring of the motor and the bearing member of the hollow spindle in a recess provided in the spindle bed.

An embodiment of the invention is represented in vertical axial section in the accompanying drawing.

$a$ is the inner or cap spindle, which is only movable axially, and $b$ is the outer rotating or hollow spindle. The spindle $b$ is enlarged at its upper portion for attachment of the sleeve $k$ of the yarn bobbin, and upon its lower end the rotor $C'$ of the electric motor $c$ is secured. The hollow spindle rotates in a bearing member $d$ preferably forming a part of the motor casing or support $d'$, and this bearing member $d$ and support $d'$ are carried by a metal membrane or diaphragm $e$ which allows a certain amount of elastic adjustment and mounting of the motor and hollow spindle. The cap spindle $a$ carrying the cap $l$ is entirely independent of and specially separated from this mounting of the motor and hollow spindle and is guided axially in a bushing $i$ below the hollow spindle. In order that both spindles may be reliably centered relatively to one another, the bushing $i$ is carried on a bearing $i'$ forming a portion of the centering or bearing member $h$ having a supporting flange $h'$ which, with the centering ring $f$ of the motor is inserted in a recess $m$ forming a centering means in the spindle bed, in which both members, $h$ and $f$, are tightly and securely held by screws (not shown) passing through a pressure ring $g$.

It will thus be seen that by my invention I provide a spindle bearing which, while it furnishes means for accurately centering the hollow rotating spindle relatively to the cap spindle so that a space is provided between the two and the desired free running of the hollow spindle is obtained, furnishes also a flexible, adjustable mounting for the hollow spindle and its driving motor.

Various modifications and changes in details of construction and arrangement of parts are considered to be within the spirit of the invention and the scope of the following claims.

What I claim is:—

1. In a spindle bearing, a spindle bed, a rigid bearing member, a cap spindle having a bearing in said bearing member, a hollow rotating spindle surrounding said cap spindle and spaced therefrom, and a flexible bearing member for said hollow spindle, said spindle bed provided with centering means, and said bearing members provided with means by which they are supported in said centering means, whereby said cap spindle and hollow spindle are arranged with their axes coincident and said hollow spindle is permitted a limited vibratory movement.

2. In a spindle bearing, a spindle bed, a rigid bearing member, a cap spindle having a bearing in said bearing member, a hollow rotating spindle surrounding said cap spindle and spaced therefrom, a flexible bearing member for said hollow spindle, and a motor having its rotor carried by said hollow spindle and its stator carried by said flexible bearing member, said spindle bed provided with centering means, and said bearing members provided with means whereby they are supported in said centering means in such manner as to center said spdindles coincidentally, said flexible bearing member permitting a limited vibratory movement of said hollow spindle.

3. In a spindle bearing, a spindle bed provided with centering means, a cap spindle, a bearing member for said cap spindle having a supporting flange for cooperation with said centering means, a hollow rotating spindle surrounding said cap spindle and spaced therefrom to permit a limited relative vibratory movement therebetween, a flexible bearing member for said hollow spindle including a resilient diaphragm, and means for clamping said flange and diaphragm with respect to said centering means to insure operative relative axial arrangement of said spindles.

4. In a spindle bearing, a spindle bed provided with centering means, a cap spindle, a bearing member for said cap spindle having a supporting flange for cooperation with said centering means, a hollow rotating spindle surrounding said cap spindle and spaced therefrom to permit a limited relative vibratory movement therebetween, a motor for rotating said hollow spindle, a casing for said motor including a bearing for said hollow spindle, a flexible diaphragm connected with said motor casing and seating in said centering means, and means for clamping said flange and diaphragm in the centering means to insure operative relative axial alignment of said spindles.

In testimony whereof, I affix my signature.

ALFRED FRIEDERICH.